United States Patent
Gahleitner et al.

(10) Patent No.: US 9,487,648 B2
(45) Date of Patent: Nov. 8, 2016

(54) HIGH FLOW POLYOLEFIN COMPOSITION WITH LOW SHRINKAGE AND CLTE

(75) Inventors: Markus Gahleitner, Neuhofen/Krems (AT); Georg Grestenberger, St. Peter in der Au (AT); Christelle Grein, Linz (AT); Cornelia Kock, Pucking (AT)

(73) Assignee: Borealis AG (AT)

( * ) Notice: Subject to any disclaimer, the term of this patent is extended or adjusted under 35 U.S.C. 154(b) by 236 days.

(21) Appl. No.: 14/232,209

(22) PCT Filed: Jul. 11, 2012

(86) PCT No.: PCT/EP2012/063595
§ 371 (c)(1),
(2), (4) Date: Apr. 7, 2014

(87) PCT Pub. No.: WO2013/010879
PCT Pub. Date: Jan. 24, 2013

(65) Prior Publication Data
US 2014/0213719 A1    Jul. 31, 2014

(30) Foreign Application Priority Data
Jul. 15, 2011 (EP) .................................... 11174132

(51) Int. Cl.
| | |
|---|---|
| *C08L 23/14* | (2006.01) |
| *C08L 23/10* | (2006.01) |
| *C08L 23/12* | (2006.01) |
| *C08L 23/04* | (2006.01) |
| *C08L 23/06* | (2006.01) |

(52) U.S. Cl.
CPC ............... *C08L 23/14* (2013.01); *C08L 23/10* (2013.01); *C08L 23/12* (2013.01); *C08L 23/04* (2013.01); *C08L 23/06* (2013.01); *C08L 23/142* (2013.01); *C08L 2207/02* (2013.01)

(58) Field of Classification Search
CPC .................................................. C08L 2207/02
See application file for complete search history.

(56) References Cited

FOREIGN PATENT DOCUMENTS

| AT | WO 2011042364 A1 * | 4/2011 | ............ C08L 23/10 |
|---|---|---|---|
| EP | 2338656 A1 | 6/2001 | |
| EP | 2036947 A1 | 3/2009 | |
| EP | 2338656 A1 | 6/2011 | |
| EP | 2495280 A1 | 9/2012 | |
| WO | 2009092691 A1 | 7/2009 | |
| WO | 2010115878 A1 | 10/2010 | |
| WO | 2010142540 A1 | 12/2010 | |
| WO | 2010149549 A1 | 12/2010 | |

OTHER PUBLICATIONS

Product Data Sheet, SOCAL U1S2, 2008.*
Extended European Search Report dated May 15, 2015.
European OA dated Feb. 4, 2015.
Tetsuo Hayashi, et al. "Heptad configurational analysis of 13C n.m.r. spectra in highly isotactic polypropylene", Polymer, 1988, vol. 29, January.
Riichiro Chujo, et al. "Two-site model analysis of 13C n.m.r. of polypropylene polymerized by Ziegler-Natta catalyst with external alkoxysilane donors", Polymer, 1994, vol. 35, No. 2.

* cited by examiner

Primary Examiner — Wenwen Cai
(74) Attorney, Agent, or Firm — Tarolli, Sundheim, Covell & Tummino LLP

(57) ABSTRACT

Polyolefin composition comprising (a) a heterophasic propylene copolymer comprising a polypropylene (PP) having a melt flow rate $MFR_2$ (230° C.) of 30 to 350 g/10 min, and an elastomeric propylene copolymer (E) having an intrinsic viscosity (IV) in the range of 1.5 to 3.0 dl/g and (b) a polyethylene having a melt flow rate $MFR_2$ (190° C.) of 15 to 100 g/10 min, wherein (i) the total polyolefin composition has a melt flow rate $MFR_2$ (230° C.) of more than 15 to 200 g/10 min, and (ii) the weight ratio of elastomeric propylene copolymer to the polyethylene is below 2.0.

13 Claims, No Drawings

HIGH FLOW POLYOLEFIN COMPOSITION WITH LOW SHRINKAGE AND CLTE

The present invention is directed to a new polyolefin composition with low shrinkage and coefficient of linear thermal expansion (CLTE) as well as to its manufacture.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or a ethylene propylene diene monomer polymer (EPDM). Further the heterophasic polypropylene contains a crystalline polyethylene to some extent. In the automobile industry such heterophasic polypropylene grades contain an amount of about 30 wt.-% propylene copolymer rubber, which normally is produced directly in one or two gas phase reactors or added externally to the matrix via a compounding step.

In the field of automotive exterior applications the shrinkage and thermal expansion of a polymer are of great importance. While the shrinkage influences the processing of a part (especially in injection molding), the coefficient of linear thermal expansion (CLTE) is important during the parts lifetime. The coefficient of linear thermal expansion (CLTE) determines the minimum gap width between two parts. Most of the time the parts are made from different materials. To avoid big gaps and high stresses in the parts the coefficient of linear thermal expansion (CLTE) should be as low as possible.

The conventional way of reducing both shrinkage and coefficient of linear thermal expansion (CLTE) in automotive compounds is to incorporate inorganic fillers (usually at high loadings, i.e. 10 to 30 wt.-%). The reduction of thermal expansion and shrinkage via filler-addition is based on two different mechanisms that most of the time act simultaneously:

volume dilution with a material of lower shrinkage/CLTE
mechanical constraint by a dispersed phase with low CLTE and high modulus. For this purpose fillers with high aspect ratios are normally used.

A disadvantage of this method is that the materials may suffer from poor toughness, bad appearance and difficulties in processing. Furthermore, the weight of these parts increases through the filler incorporation. To minimize the need for filler incorporation the polymer itself should feature a high dimensional stability.

Thus the object of the present invention is to provide a polyolefin composition of low coefficient of linear thermal expansion (CLTE), low shrinkage and rather low weight, without compromising the toughness and stiffness of said composition. Further it is desired to enhance the scratch resistance of parts made from the polyolefin composition.

The finding of the present invention is to provide a polyolefin composition comprising
(a) a heterophasic propylene copolymer (HECO), said heterophasic propylene copolymer (HECO) comprises
(a1) a polypropylene (PP) having a melt flow rate $MFR_2$ (230° C.) of 30 to 350 g/10 min, and
(a2) an elastomeric propylene copolymer (E) having an intrinsic viscosity (IV) in the range of 1.5 to 3.0 dl/g measured as the intrinsic viscosity (IV) of the xylene cold soluble (XCS) fraction of the heterophasic propylene copolymer (HECO), and
(b) a polyethylene (PE) having a melt flow rate $MFR_2$ (190° C.) of 15 to 100 g/10 min, preferably of more than 15 to 100 g/10 min, wherein
(i) the total polyolefin composition (PO) has a melt flow rate $MFR_2$ (230° C.) of more than 15 to 200 g/10 min, and
(ii) the weight ratio of elastomeric propylene copolymer (E) to the polyethylene (PE) is below 2.0.

To further improve the properties of the polyolefin composition (PO) an inorganic filler (F) and/or a second polyethylene (PE2) different to the first polyethylene (PE) mentioned above may be incorporated in the polyolefin composition (PO).

It has been surprisingly found out that such a polyolefin composition (PO) has superior properties compared to known compositions in this technical field. In particular the shrinkage as well as the coefficient of linear thermal expansion (CLTE) values a very low without compromising the mechanical properties, like toughness and stiffness (see examples). Also the scratch resistance has been positively effected.

In the following the invention will be described in more detail below.

As mentioned above the polyolefin composition shall be used in particular in the field of automotive. In this area there is a trend to larger articles. The problem of such articles is that high pressures are needed during manufacture. To reduce pressure, the melt flow of the used material should be rather low. Accordingly the polyolefin composition of the instant invention shall have a melt flow rate $MFR_2$ (230° C.) of more than 15 to 200 g/10 min, preferably of 20 to 150 g/10 min, more preferably of 20 to 80 g/10 min, yet more preferably of 22 to 80 g/10 min.

Important further aspect of the present invention is that the polyethylene (PE) is in rather high amounts present in the polyolefin composition. It has been observed that with low amounts of polyethylene (PE) the desired improvement in the thermal expansion and/or shrinkage cannot be achieved. Accordingly it is preferred that the weight ratio of elastomeric propylene copolymer (E) to the polyethylene (PE) [(E)/(PE)] is below 2.0, more preferably below 1.8, still more preferably in the range of 1.0 to 2.0, yet more preferably in the range of 1.2 to 1.8, still yet more preferably in the range of 1.2 to below 1.6.

Accordingly it is preferred that the amount of polyethylene (PE) within the total polyolefin composition (PO) is at least 10 wt.-%, more preferably in the range of 10 to 30 wt.-%, still more preferably in the range of 12 to 20 wt.-%.

Therefore in one preferred aspect the polyolefin composition (PO) comprises
(a) 50 to 90 wt.-%, more preferably 60 to 80 wt.-%, of the heterophasic propylene copolymer (HECO),
(b) 10 to 30 wt.-%, more preferably 12 to 20 wt.-%, of the polyethylene (PE),
(c) 0 to 30 wt.-%, more preferably 1 to 30 wt.-%, still more preferably 1 to 9 wt.-%, of the inorganic filler (F), and
(d) 0 to 15 wt.-%, more preferably 3 to 9 wt.-%, of the polyethylene (PE2), based on the total polyolefin composition (PO), preferably based on the total amount of polymers present in the polyolefin composition (PO) and inorganic filler (F).

Additionally the polyolefin composition (PO) may comprise in small amounts, i.e. not more than 10 wt.-% of a further second heterophasic propylene copolymer (HECO2). Said second heterophasic propylene copolymer (HECO2) differs from the first heterophasic propylene copolymer (HECO) especially in the melt flow rate. Accordingly the second heterophasic propylene copolymer (HECO2)—if present—has a melt flow rate MFR$_2$ (230° C.) of below 20 g/10 min.

Thus in a very specific embodiment the instant polyolefin composition (PO) comprises
(a) 50 to 90 wt.-%, more preferably 60 to 80 wt.-%, of the heterophasic propylene copolymer (HECO),
(b) 10 to 30 wt.-%, more preferably 12 to 20 wt.-%, of the polyethylene (PE),
(c) 0 to 30 wt.-%, more preferably 1 to 30 wt.-%, still more preferably 1 to 9 wt.-%, of the inorganic filler (F),
(d) 0 to 15 wt.-%, more preferably 3 to 9 wt.-%, of the polyethylene (PE2), and
(e) 0 to 10 wt.-%, more preferably 3 to 9 wt.-%, of the second heterophasic propylene copolymer (HECO2), based on the total polyolefin composition (PO), preferably based on the total amount of polymers present in the polyolefin composition (PO) and the inorganic filler (F), more preferably based on the total amount of the heterophasic propylene copolymer (HECO), polyethylene (PE), the second polyethylene (PE2), the second heterophasic propylene copolymer (HECO2) and the inorganic filler (F).

As mentioned above the polyolefin composition of the instant invention is featured by good mechanical properties. Accordingly it is preferred that the polyolefin composition (PO) has tensile modulus of at least 900 MPa, more preferably of at least 1000 MPa, yet more preferably in the range of 950 to 1,600 MPa, still more preferably in the range of 1,000 to 1450 MPa. These values are in particular applicable in case the polyolefin composition (PO) comprises not more than 10 wt.-%, i.e. not more than 9 wt.-% inorganic filler (F).

Further also the impact should be rather high. Accordingly it is appreciated that the polyolefin composition (PO) has an impact strength at 23° C. of at least 10 kJ/m$^2$, more preferably of at least 14 kJ/m$^2$, yet more preferably in the range of 10 to 70 kJ/m$^2$, still more preferably in the range of 14 to 60 kJ/m$^2$, and/or has an impact strength at −20° C. of at least 2.2 kJ/m$^2$, more preferably of at least 3.0 kJ/m$^2$, yet more preferably in the range of 2.2 to 10.0 kJ/m$^2$, still more preferably in the range of 3.0 to 7.0 kJ/m$^2$. The measuring method of the impact strength is defined in the example section.

Concerning the thermal expansion it is preferred that the polyolefin composition (PO) has a coefficient of linear thermal expansion (CLTE) performed in a temperature range from −30 to +80° C. of not more than 100 μm/mK, more preferably of not more 96 μm/mK, still more preferably in the range of 70 to 100 μm/mK, yet more preferably in the range of 78 to 96 μm/mK. This values are in particular applicable in case the polyolefin composition (PO) comprises not more than 10 wt.-%, i.e. not more than 9 wt.-% inorganic filler (F).

The polyolefin composition (PO) in accordance with the present invention may be prepared by compounding the components within suitable melt mixing devices for preparing polymeric compounds, including in particular extruders, like single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C.

In the following the individual components are defined in more detail.

Heterophasic Propylene Copolymer

The expression "heterophasic" as used in the instant invention indicates that the elastomeric propylene copolymer (E) is (finely) dispersed in the polypropylene (PP). In other words the polypropylene (PP) constitutes a matrix in which the elastomeric propylene copolymer (E) forms inclusions in the matrix, i.e. in the polypropylene (PP). Thus the matrix contains (finely) dispersed inclusions being not part of the matrix and said inclusions contain the elastomeric propylene copolymer (E). The term "inclusion" according to this invention shall preferably indicate that the matrix and the inclusion form different phases within the heterophasic system, said inclusions are for instance visible by high resolution microscopy, like electron microscopy or scanning force microscopy.

Further it is preferred that the heterophasic propylene copolymer (HECO) before mixed with the other components mentioned herein comprises as polymer components only the polypropylene (PP) and the elastomeric propylene copolymer (E). In other words the heterophasic propylene copolymer (HECO) may contain further additives but no other polymer in an amount exceeding 5 wt-%, more preferably exceeding 3 wt.-%, like exceeding 1 wt.-%, based on the total heterophasic propylene copolymer (HECO), more preferably based on the polymers present in the propylene copolymer (HECO). One additional polymer which may be present in such low amounts is a polyethylene which is a reaction product obtained by the preparation of the heterophasic propylene copolymer (HECO). Accordingly it is in particular appreciated that a heterophasic propylene copolymer (HECO) as defined in the instant invention contains only a polypropylene (PP), an elastomeric propylene copolymer (E) and optionally a polyethylene in amounts as mentioned in this paragraph.

Also the polyolefin composition (PO) of the present invention can be regarded as a heterophasic system. Accordingly the polypropylene (PP) of the heterophasic propylene copolymer (HECO) constitutes also the matrix of the overall polyolefin composition (PO). The elastomeric propylene copolymer (E) and the polyethylene (PE), and optionally also the inorganic filler (F) and the second polyethylene (PE2), are (finely) dispersed in said matrix. Thereby the elastomeric propylene copolymer (E) and the polyethylene (PE) may form separate inclusions in the matrix, i.e. in the polypropylene (PP) or the polyethylene (PE) may form an inclusion within the inclusion of the elastomeric propylene copolymer (E). In case the total polyolefin composition (PO) comprises also a second heterophasic propylene copolymer (HECO2), then the matrix of the second heterophasic propylene copolymer (HECO2) forms together with the matrix, i.e. the polypropylene (PP), of the first heterophasic propylene copolymer (HECO) the matrix of the total polyolefin composition (PO). The elastomeric phase of the second heterophasic propylene copolymer (HECO2) forms also inclusions within the overall polyolefin composition (PO).

One important aspect of the instant invention is that the polyolefin composition has a rather high melt flow rate. Accordingly it is preferred that the heterophasic propylene copolymer (HECO) has a melt flow rate MFR$_2$ (230° C.) of at least 15 g/10 min, more preferably in the range of 15 to 300 g/10 min, yet more preferably in the range of 20.0 to 100 g/10 min, still more preferably in the range of 20 to 80 g/10 min.

Preferably it is desired that the heterophasic propylene copolymer (HECO) is thermo mechanically stable. Accordingly it is appreciated that the heterophasic propylene copolymer (HECO) has a melting temperature (T$_m$) of at least 135° C., more preferably in the range of 135 to 168° C.

Preferably the propylene content in the heterophasic propylene copolymer (HECO) is 82.0 to 94.0 wt.-%, more preferably 86.0 to 92.0 wt.-%, based on the total heterophasic propylene copolymer (HECO), more preferably based on the amount of the polymer components of the heterophasic propylene copolymer (HECO), yet more preferably based on the amount of the polypropylene (PP) and the elastomeric propylene copolymer (E) together. The remaining part constitutes the comonomers as defined for the polypropylene (PP) being a random propylene copolymer (R-PP) and the elastomeric propylene copolymer (E), respectively, preferably ethylene. Accordingly the comonomer content, preferably ethylene content is in the range of 6.0 to 18.0 wt.-%, more preferably in the range of 8.0 to 14.0 wt.-%.

As stated above the matrix of the heterophasic propylene copolymer (HECO) is the polypropylene (PP).

The polypropylene (PP) according to this invention shall have a melt flow rate $MFR_2$ (230° C.) of 30 to 350 g/10 min, preferably in the range of 60 to 250 g/10 min, more preferably in the range of 80 to 150 g/10 min.

Accordingly it is preferred that the polypropylene (PP) has a weight average molecular weight ($M_w$) from 100,000 to 300,000 g/mol, more preferably from 150,000 to 250,000 g/mol.

A broad molecular weight distribution (MWD) improves the processability of the polypropylene. Accordingly it is appreciated that the molecular weight distribution (MWD) of the polypropylene (PP) is at least 2.8, more preferably at least 3.0, like at least 3.3 In a preferred embodiment the molecular weight distribution (MWD) is preferably between 2.8 to 10.0, still more preferably in the range of 3.0 to 8.0.

The polypropylene (PP) can be a random propylene copolymer (R-PP) or a propylene homopolymer (H-PP), the latter is preferred.

Accordingly it is appreciated that the polypropylene (PP) has a comonomer content equal or below 10.0 wt.-%, more preferably equal or below 7.0 wt.-%.

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

In case the polypropylene (PP) is a random propylene copolymer (R-PP) it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the random propylene copolymer (R-PP) comprises, especially consists of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only. The comonomer content in the random propylene copolymer (R-PP) is preferably in the range of more than 0.5 to 10.0 wt.-%, still more preferably in the range of more than 0.5 to 7.0 wt.-%.

The term "random copolymer" indicates that the comonomers within the propylene copolymer (PP) are randomly distributed. The randomness defines the amount of isolated comonomer units, i.e. those which have no neighbouring comonomer units, compared to the total amount of comonomers in the polymer chain.

Preferably the polypropylene (PP) is isotactic. Accordingly it is appreciated that the propylene homopolymer (H-PP) has a rather high pentad concentration, i.e. more than 90%, more preferably more than 92%, still more preferably more than 93% and yet more preferably more than 95%, like at least 97%. On the other hand it is preferred that the random propylene copolymer (R-PP) a triad concentration of more than 90%, more preferably more than 92%, still more preferably more than 93% and yet more preferably more than 95%, like at least 97%.

Further it is preferred that the polypropylene has a crystallinity of at least 40%, more preferably in the range of 40 to 65%, like in the range of 45 to 60%.

The polypropylene (PP) can have a xylene cold soluble content (XCS) in a broad range, i.e. up to 6.0 wt.-%. Accordingly the polypropylene (PP) may have a xylene cold soluble content (XCS) in the range of 0.3 to 6.0 wt.-%, like 0.5 to 5.5 wt.-%.

However in preferred embodiments the polypropylene (PP), in particular in case the polypropylene (PP) is a propylene homopolymer (H-PP), has a xylene cold soluble (XCS) content in the range of 0.5 to 4.5 wt.-%, more preferably in the range of 1.0 to 4.0 wt.-%, still more preferably of 1.5 to 3.5 wt.-%.

One further essential component of the heterophasic propylene copolymer (HECO) is its elastomeric propylene copolymer (E).

The elastomeric propylene copolymer (E) preferably comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer phase (E) comprises units derivable from ethylene and propylene only.

In case the polypropylene (PP) is a random propylene copolymer (R-PP) it is preferred that the comonomer(s) of the random propylene copolymer (R-PP) and the elastomeric propylene copolymer (E) are the same.

The properties of the elastomeric propylene copolymer phase (E) mainly influences the xylene cold soluble (XCS) content of the heterophasic propylene copolymer (HECO). Thus according to the present invention the xylene cold soluble (XCS) fraction of heterophasic propylene copolymer (HECO) is regarded as the elastomeric propylene copolymer (E) of the heterophasic propylene copolymer (HECO).

Accordingly, the amount of the elastomeric propylene copolymer (E), i.e. of the xylene cold soluble (XCS) fraction, of the heterophasic propylene copolymer (HECO) preferably is in the range of 20 to 50 wt.-%, more preferably in the range of 25 to 40 wt.-%, still more preferably in the range of 25 to 38 wt.-%. These values are base on the heterophasic propylene copolymer (HECO) and not on the polyolefin composition (PO).

One important requirement of the present invention is that the elastomeric propylene copolymer (E) has a balanced weight average molecular weight. Small particles are formed in case the matrix and the elastomeric phase have similar molecular weight. Small particles are generally preferred, because this improves the overall properties of the heterophasic system. However, in the instant invention the matrix has by trend a high melt flow rate and thus a rather low weight average molecular weight. Accordingly also the elastomeric propylene copolymer (E) should have a low weight average molecular weight in order to obtain small particles. On the other hand this would mean in the present case a severe reduction in low weight average molecular weight for the elastomeric propylene copolymer (E), which has negative impact on the mechanical properties. Accordingly the intrinsic viscosity must be carefully chosen.

Low intrinsic viscosity (IV) values reflect a low weight average molecular weight. Thus it is appreciated that the elastomeric propylene copolymer phase (E), i.e. the xylene cold soluble fraction (XCS) of the heterophasic propylene copolymer (HECO), has an intrinsic viscosity (IV) in the range of 1.5 to 3.0 dl/g, more preferably in the range of equal or more than 1.8 to equal or less than 2.8 dug, still more preferably in the range of equal or more than 2.0 to equal or less than 2.6 dug.

The comonomer content, preferably the ethylene content, within the elastomeric propylene copolymer phase (E) shall be preferably also in a specific range. Accordingly in a preferred embodiment the comonomer content, more preferably ethylene content, of the elastomeric propylene copolymer (E), i.e. of the xylene cold soluble fraction (XCS) of the heterophasic propylene copolymer (HECO), is equal or less than 75 wt.-%, more preferably in the range of 15 to 75 wt.-%, still more preferably in the range of 20 to 50 wt.-%, yet more preferably in the range of 25 to 40 wt.-% Accordingly it is appreciated that the propylene content of the elastomeric propylene copolymer (E), i.e. of the xylene cold soluble fraction (XCS) of the heterophasic propylene copolymer (HECO), is equal or more 25 wt.-%, more preferably in the range of 25 to 85 wt.-%, still more preferably in the range of 50 to 80 wt.-%, yet more preferably in the range of 60 to equal or less than 75 wt.-%.

As will be explained below, the heterophasic polypropylene (HECO) as well their individual components (matrix and elastomeric copolymer) can be produced by blending different polymer types, i.e. of different molecular weight and/or comonomer content. However it is preferred that the heterophasic polypropylene (HECO) as well their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

The heterophasic propylene copolymer (HECO) according to this invention is preferably produced in a sequential polymerization process, i.e. in a multistage process, known in the art, wherein the polypropylene (PP) is produced at least in one slurry reactor, preferably in a slurry reactor and optionally in a subsequent gas phase reactor, and subsequently the elastomeric propylene copolymer (E) is produced at least in one, i.e. one or two, gas phase reactor(s).

Accordingly it is preferred that the heterophasic propylene copolymer (HECO) is produced in a sequential polymerization process comprising the steps of (a) polymerizing propylene and optionally at least one ethylene and/or $C_4$ to $C_{12}$ α-olefin in a first reactor (R1) obtaining the first polypropylene (PP), preferably said first polypropylene fraction is a first propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the polypropylene (PP), i.e. the matrix of the heterophasic propylene copolymer (HECO), (d) transferring the polypropylene (PP) of step (c) into a third reactor (R3), (e) polymerizing in the third reactor (R3) and in the presence of the polypropylene (PP) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the polypropylene (PP), (f) transferring the polypropylene (PP) in which the first elastomeric propylene copolymer fraction is dispersed in a fourth reactor (R4), and (g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the polypropylene (PP), the first elastomeric propylene copolymer fraction, and the second elastomeric propylene copolymer fraction form the heterophasic propylene copolymer (HECO).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic propylene copolymer (HECO) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

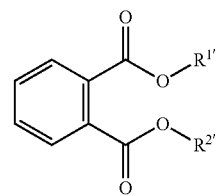

(I)

wherein $R^{1'}$ and $R^{2'}$ are independently at least a $C_5$ alkyl
under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

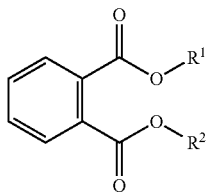 (II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (Mb). Formula (IIIa) is defined by

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R_x$ and $R^y$ are an ethyl group.

More preferably the external donor of formula (Mb) is diethylaminotriethoxysilane.

Most preferably the external donor is of formula (IIIa), like dicyclopentyl dimethoxy silane [Si(OCH$_3$)$_2$(cyclo-pentyl)$_2$] or diisopropyl dimethoxy silane [Si(OCH$_3$)$_2$(CH(CH$_3$)$_2$)$_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

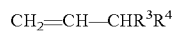

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Accordingly it is appreciated that the heterophasic propylene copolymer (HECO) is α-nucleated. In case the α-nucleation is not effected by a vinylcycloalkane polymer or a vinylalkane polymer as indicated above, the following α-nucleating agents (N) may be present
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl) phosphate or aluminium-hydroxy-bis[2,2'-methylene-bis(4,6-di-t-butylphenyl)phosphate], and
(iv) mixtures thereof Polyethylene As mentioned above the instant polyolefin composition (PO) must comprise a (first) polyethylene (PE) and optionally a second polyethylene (PE2). Preferably the polyethylene (PE2) differs at least from the (first) polyethylene (PE) in density and/or melt flow rate. The (first) polyethylene (PE) and the second polyethylene (PE2) are well known in the art and commercially available.

According to the present invention the polyethylene (PE) must have a melt flow rate $MFR_2$ (190° C.) in the range of 15 to 100 g/10 min, preferably in the range of more than 15 to 100 g/10 min, more preferably in the range of 18.0 to 100.0, still more preferably in the range of 20.0 to 100.0 g/10 min, yet more preferably in the range of 10.0 to 80.0 g/10 min, like 25 to 50 g/10 min Preferably the (first) polyethylene (PE) is a high density polyethylene (HDPE). Thus it is appreciated that the (first) polyethylene (PE) has a density of at least 945 kg/m³, more preferably of at least 955 kg/m³, yet more preferably in the range of 945 to 975 kg/m³, still yet more preferably in the range of 955 to 968 kg/m³.

The second polyethylene (PE2)—if present—preferably differs from the (first) polyethylene (PE) by the melt flow rate. Accordingly it is preferred that the second polyethylene (PE2) has a lower melt flow rate $MFR_2$ (190° C.) than the (first) polyethylene (PE). More preferably the second polyethylene (PE2) has a melt flow rate $MFR_2$ (190° C.) in the range of 0.5 to 30 g/10 min, more preferably in the range 0.5 to below 15 g/10 min, yet more preferably in the range of 0.5 to 10 g/10 min Preferably the second polyethylene (PE2) is a low density polyethylene (900 to below 940 kg/m³, i.e. 910 to below 940 kg/m³) or a linear low density polyethylene (LLDPE) (820 to below 900 kg/m³), the latter preferred.

The second polyethylene (PE2) is an ethylene homopolymer or an ethylene copolymer, the latter being preferred. Accordingly the ethylene content in the low density polyethylene (LDPE) is at least 80 wt.-%, more preferably at least 90 wt.-%.

The expression ethylene homopolymer used in the instant invention relates to a polyethylene that consists substantially, i.e. of more than 99.7 wt.-%, still more preferably of at least 99.8 wt.-%, of ethylene units. In a preferred embodiment only ethylene units in the ethylene homopolymer are detectable.

In case second polyethylene (PE2), i.e. the linear low density polyethylene (LLDPE), is an ethylene copolymer it is preferred that it contains as a major part units derivable from ethylene. Accordingly it is appreciated that the second polyethylene (PE2), i.e. the linear low density polyethylene (LLDPE), being an ethylene copolymer comprises at least 55 wt.-% units derivable from ethylene, more preferably at least 60 wt.-% of units derived from ethylene. Thus it is appreciated that the second polyethylene (PE2), i.e. the linear low density polyethylene (LLDPE), being an ethylene copolymer comprises 60 to 99.5 wt.-%, more preferably 90 to 99 wt.-%, units derivable from ethylene. The comonomers present in such a second polyethylene (PE2), i.e. the linear low density polyethylene (LLDPE), are $C_4$ to $C_{20}$ α-olefins, like 1-butene, 1-hexene and 1-octene, the latter especially preferred, or dienes, preferably non-conjugated α,ω-alkadienes, i.e. $C_5$ to $C_{20}$ α,ω-alkadienes, like 1,7-octadiene. Accordingly in one specific embodiment the second polyethylene (PE2), i.e. the linear low density polyethylene (LLDPE), being an ethylene copolymer is an ethylene-1,7-octadiene polymer with the amounts given in this paragraph.

As mentioned above the (first) polyethylene (PE) and optionally the second polyethylene (PE2) preferably are also dispersed in the matrix, i.e. in the polypropylene (PP), of the heterophasic propylene copolymer (HECO) and thus forming the overall polyolefin composition.

Inorganic Filler

In addition to the polymer components the polyolefin composition may comprise an inorganic filler (F) in amounts of up to 30 wt.-%, preferably in the range of 1 to 30 wt.-%, yet more preferably in the range of 3 to 9 wt.-%. Preferably the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

The mineral filler (F) preferably has a cutoff particle size d95 [mass percent] of equal or below 20 μm, more preferably in the range of 2.5 to 10 μm, like in the range of 2.5 to 8.0 μm. Typically the inorganic filler (F) has a surface area measured according to the commonly known BET method with $N_2$ gas as analysis adsorptive of less than 22 m²/g, more preferably of less than 20 m²/g, yet more preferably of less than 18 m²/g. Inorganic fillers (F) fulfilling these requirements are preferably anisotropic mineral fillers (F), like talc, mica and wollastonite.

Further Components

As mentioned above a second heterophasic propylene copolymer (HECO2) may be present in the polyolefin composition (PO) for fine tuning of the properties. It is preferred that the second heterophasic propylene copolymer (HECO2) is present in small amounts, i.e. not more than 10 wt.-%. Said second heterophasic propylene copolymer (HECO2) differs from the first heterophasic propylene copolymer (HECO) especially in the melt flow rate. Accordingly the second heterophasic propylene copolymer (HECO2)—if present—has a melt flow rate $MFR_2$ (230° C.) of below 20 g/10 min, more preferably in the range of 1 to 15 g/10 min, yet more preferably in the range of 3 to 10 g/10 min Concerning the definition of a heterophasic system reference is made to information provided above. Accordingly also the second heterophasic propylene copolymer (HECO2) comprises a polypropylene matrix in which an elastomeric propylene copolymer (E2) is dispersed.

The matrix of the second heterophasic propylene copolymer (HECO2) is a second random propylene copolymer (R-PP2). This second random propylene copolymer (R-PP2) comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the second random propylene copolymer (R-PP2) comprises, especially consists of, monomers copolymerizable with propylene from the group consisting of ethylene, 1-butene and 1-hexene. More specifically the second random propylene copolymer (R-PP2) comprises—apart from propylene—units derivable from ethylene and/or 1-butene. In a preferred embodiment the second random propylene copolymer (R-PP2) comprises units derivable from ethylene and propylene only. The comonomer content in the second random propylene copolymer (R-PP2) is preferably in the range of more than 0.5 to 10.0 wt.-%, still more preferably in the range of more than 0.5 to 7.0 wt.-%.

The second random propylene copolymer (R-PP2) has preferably a melt flow rate $MFR_2$ (230° C.) of 1 to 20 g/10 min, preferably in the range of 3 to 15 g/10 min, more preferably in the range of 5 to 10 g/10 min, One further component of the second heterophasic propylene copolymer (HECO2) is its second elastomeric propylene copolymer (E2).

The second elastomeric propylene copolymer (E2) preferably comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the second elastomeric propylene copolymer (E2) comprises, especially consists of, monomers copolymerizable with propylene from the group consisting of ethylene, 1-butene and 1-hexene. More specifically the second elastomeric propylene copolymer (E2) comprises—apart from propylene—units derivable from ethylene and/or 1-butene. Thus in an especially preferred embodiment the second elastomeric propylene copolymer phase (E2) comprises units derivable from ethylene and propylene only.

The comonomer content, preferably the ethylene content, within the elastomeric propylene copolymer phase (E) shall be preferably also in a specific range. Accordingly in a preferred embodiment the comonomer content, more preferably ethylene content, of the elastomeric propylene copolymer (E) of the heterophasic propylene copolymer (HECO), is equal or less than 45 wt.-%, more preferably in the range of 5 to 40 wt.-%, still more preferably in the range of 12 to 35 wt.-%, yet more preferably in the range of 18 to 30 wt.-% Accordingly it is appreciated that the propylene content of the elastomeric propylene copolymer (E) of the second heterophasic propylene copolymer (HECO2), is equal or more 15 wt.-%, more preferably in the range of 20 to 85 wt.-%, still more preferably in the range of 30 to 80 wt.-%, yet more preferably in the range of 50 to equal or less than 75 wt.-%.

It is especially preferred that the second random propylene copolymer (R-PP2) and the second elastomeric propylene copolymer (E2) contain the same comonomers, like ethylene.

The xylene cold soluble (XCS) fraction of the second heterophasic propylene copolymer (HECO2) is preferably is in the range of 15 to 50 wt.-%, more preferably in the range of 18 to 40 wt.-%, still more preferably in the range of 20 to 38 wt.-%. These values are based on the second heterophasic propylene copolymer (HECO2) and not on the polyolefin composition (PO).

Finally the instant polyolefin composition (PO) may comprise typical additives, like acid scavengers (AS), antioxidants (AO), nucleating agents (NA), hindered amine light stabilizers (HALS), slip agents (SA), and pigments. Preferably the amount of additives excluding the inorganic filler (F) shall not exceed 7 wt.-%, more preferably shall not exceed 5 wt.-%, like not more than 3.5 wt.-%, within the instant composition.

Articles Made from the Polyolefin Composition (PO)

The polyolefin composition (PO) of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like.

The current invention also provides (automotive) articles, like injection molded articles, comprising at least to 60 wt.-%, more preferably at least 80 wt.-%, yet more preferably at least 95 wt.-%, like consisting, of the inventive polyolefin composition (PO). Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polyolefin composition (PO).

The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}C$-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad and mm triad concentration in a manner well known in the art.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Density is measured according to ISO 1183-1—method A (2004). Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 µm and spectra recorded in transmission mode. Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

The xylene cold solubles (XCS, wt.-%): Content of xylene cold solubles (XCS) is determined at 25° C. according ISO 16152; first edition; 2005-07-01

Intrinsic viscosity is measured according to DIN ISO 1628/1, October 1999 (in Decalin at 135° C.).

Tensile Modulus; Tensile strain at break are measured according to ISO 527-2 (cross head speed=1 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179 2C/DIN 53453 at 23° C., −20° C., using injection molded bar test specimens of 80×10×4 $mm^3$ $mm^3$ prepared in accordance with ISO 294-1:1996.

Coefficient of linear thermal expansion: The coefficient of linear thermal expansion (CLTE) was determined in accordance with ISO 11359-2:1999 on 10 mm long pieces cut from the same injection molded specimens as used for the flexural modulus determination. The measurement was performed in a temperature range from −30 to +80° C. at a heating rate of 1° C./min.

Shrinkage: The shrinkage is determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s Tool temperature: 40° C., back pressure: 600 bar.

After conditioning the specimen at room temperature for 96 hours the dimensional changes radial and tangential to the flow direction are measured for both disks. The average of respective values from both disks are reported as final results.

To determine the scratch resistance a Cross Hatch Cutter Model 420P, manufactured by Erichsen, was used. For the tests, plaques of 70×70×4 mm size were cut from a moulded grained (grain parameters: average grain size=1 mm, grain depth=0.12 mm, conicity=6°, also known as Grain VW K09) plaque of size 140×200×3 mm. The period between injection moulding of specimens and scratch-testing was 7 days.

For testing the specimens must be clamped in a suitable apparatus as described above. Scratches were applied at a force of 10 N using a cylindrical metal pen with a ball shaped end (radius=0.5 mm±0.01). A cutting speed of 1000 mm/min was used.

A minimum of 20 scratches parallel to each other were brought up at a load of 10 N with a distance of 2 mm. The application of the scratches was repeated perpendicular to each other, so that the result was a scratching screen. The scratching direction should be unidirectional. The scratch resistance is reported as the difference of the luminance ΔL of the unscratched from the scratched areas. ΔL values were measured using a spectrophotometer that fulfils the requirements to DIN 5033. Light source for quantification of ΔL D65/10°. Measured ΔL values must be below a maximum of 1.5.

A detailed test description of the test method (Erichsen cross hatch cutter method) can be found in the article "Evaluation of scratch resistance in multiphase PP blends" by Thomas Koch and Doris Machl, published in POLYMER TESTING 26 (2007), p. 927-936. The gloss was measured on injection moulded grained specimen according to DIN 67530 at an angle of 60°. The grain for gloss measurements was identical to the grain used in evaluation of scratch resistance.

Cutoff particle size (195 (Sedimentation) is calculated from the particle size distribution [mass percent] as determined by gravitational liquid sedimentation according to ISO 13317-3 (Sedigraph)

Specific surface area is determined as the BET surface according to DIN 66131/2.

2. Examples

The two experimental heterophasic propylene copolymers HECOs were produced in a Borstar pilot plant with a prepolymerization reactor, one slurry loop reactor and three gas phase reactors. The catalyst Polytrack 8502, commercially available from Grace (US) was used in combination with diethylaminotriethoxysilane [$Si(OCH_2CH_3)_3(N(CH_2CH_3)_2)$] as external donor and triethylaluminium (TEAL) as activator and scavenger in the ratios indicated in table 1. The catalyst was modified by polymerising a vinyl compound in the presence of the catalyst system.

TABLE 1

Preparation of the heterophasic propylene copolymers (HECO)

| Parameter | unit | HECO |
|---|---|---|
| Prepolymerisation | | |
| temperature | [° C.] | 30 |
| pressure | [kPa] | 5200 |
| Al/donor ratio | [mol/mol] | 10 |
| residence time | [h] | 0.5 |
| Loop | | |
| temperature | [° C.] | 70 |
| pressure | [kPa] | 5500 |
| residence time | [h] | 0.5 |
| ethylene feed | [kg/h] | 0 |
| H2/C3 ratio | [mol/kmol] | 20 |
| GPR1 | | |
| temperature | [° C.] | 80 |
| pressure | [kPa] | 1600 |
| residence time | [h] | 1.7 |
| ethylene feed | [kg/h] | 0.2 |
| H2/C3 ratio | [mol/kmol] | 130 |
| GPR2 | | |
| temperature | [° C.] | 80 |
| pressure | [kPa] | 2700 |
| residence time | [h] | 2.3 |
| ethylene feed | [kg/h] | 32.2 |
| H2/C3 ratio | [mol/kmol] | 21 |
| C2/C3 ratio | [mol/kmol] | 300 |
| GPR3 | | |
| temperature | [° C.] | 85 |
| pressure | [kPa] | 2600 |
| residence time | [h] | 1.2 |
| ethylene feed | [kg/h] | 17 |
| H2/C2 ratio | [mol/kmol] | 70 |
| C2/C3 ratio | [mol/kmol] | 300 |

TABLE 2

The heterophasic polypropylenes (HECO)

| | | HECO | HECO 2 |
|---|---|---|---|
| MFR of Matrix | [g/10 min] | 250 | 8 |
| XCS of Matrix | [wt %] | 2.5 | — |
| C2 of Matrix | [wt %] | 0 | — |
| MFR | [g/10 min] | 35 | 7 |
| XCS | [wt %] | 31.0 | 23 |
| C2 total | [wt %] | 11.0 | 8 |
| C2 in XCS | [wt %] | 33 | 25 |
| IV of XCS | [dl/g] | 2.4 | 1.2 |

HECO 2 commercial heterophasic propylene copolymer product SD 233 CF of Borealis AG

TABLE 3

Comparative Examples

| | | Example* | | | | | |
|---|---|---|---|---|---|---|---|
| | | CE 1 | CE 2 | CE 3 | CE 4 | CE 5 | CE 6 |
| HECO | [wt %] | 97.5 | 91.5 | 81.5 | 90 | 75.5 | 86.5 |
| Talc | [wt %] | — | — | — | 7.0 | 7.0 | — |
| PE-A | [wt %] | — | — | — | — | 14.5 | — |
| PE-B | [wt %] | — | — | — | — | — | 11 |
| PE-C | [wt %] | — | 6 | 16 | — | — | — |
| PE2 | [wt %] | — | — | — | — | — | — |
| HECO 2 | [wt %] | — | — | — | — | — | — |
| MFR | [g/10 min] | 35.1 | 35.5 | 35.3 | 36.2 | 32.0 | 31.1 |
| Tensile Modulus | [MPa] | 1197 | 1081 | 1001 | 1481 | 1061 | 1083 |
| Tensile strain at break | [%] | 17 | 15 | 34.2 | 14 | 114 | 22.1 |
| Impact strength +23° C. | [kJ/m$^2$] | 13 | 19 | 13 | 11 | 10 | 14 |
| Impact strength −20° C. | [kJ/m$^2$] | 6.4 | 6.9 | 5.7 | 2.8 | 3.7 | 6.7 |
| SH radial | [%] | 1.8 | 1.8 | 1.5 | 1.5 | 1.1 | 1.7 |
| CLTE −30/80 | [μm/mK] | 110 | 110 | 111 | 97 | 89 | 113 |
| Scratch resistance 10N | ΔL | 1.8 | — | — | 4.8 | 3.6 | — |
| Gloss (60°) | [%] | 2.7 | — | — | 2.3 | 2.3 | — |

*Rest to 100 wt.-% are additives, like antioxidants and pigments (e.g. Carbon black)

"Talc" is the commercial talc Jetfine 3CA of Luzenac having a cutoff particle size d95 of 3.3 μm (sedigraph) as well as a specific surface area of 14.5 m$^2$/g, "PE-A" is the commercial product Engage 8400 of Dow Elastomers having a MFR$_2$ (190° C./2.16 kg) of 30 g/10 min and a density of 870 kg/m$^3$, "PE-B" is the commercial high density polyethylene product MG 9601 of Borealis AG having a MFR$_2$ (190° C./2.16 kg) of 31 g/10 min and a density of 960 kg/m$^3$, "PE-C" is the commercial linear low density polyethylene product Superpass Ifs932-R of Nova Chemicals having a MFR$_2$ (190° C./2.16 kg) of 150 g/10 min and a density of 932 kg/m$^3$, "PE2" is the commercial product Engage 8100 of Dow Elastomers having a MFR$_2$ (190° C./2.16 kg) of 1 g/10 min and a density of 870 kg/m$^3$,

TABLE 4

Inventive Examples

| | | Example* | | | |
|---|---|---|---|---|---|
| | | E 1 | E 2 | E 3 | E 4 |
| HECO | [wt %] | 81.5 | 75.5 | 69.0 | 62.5 |
| Talc | [wt %] | — | 7.0 | 7.0 | 7 |
| PE-A | [wt %] | — | — | — | — |
| PE-B | [wt %] | 16.0 | 14.5 | 14.0 | 15.5 |
| PE2 | [wt %] | — | — | — | 5.0 |
| HECO 2 | [wt %] | — | — | 7.0 | 7.0 |
| MFR | [g/10 min] | 31.6 | 29.9 | 24.7 | 22.3 |
| Tensile Modulus | [MPa] | 1076 | 1327 | 1311 | 1219 |
| Tensile strain at break | [%] | 22 | 19 | 37 | 159 |
| Impact strength +23° C. | [kJ/m$^2$] | 14 | 10 | 45 | 54 |
| Impact strength −20° C. | [kJ/m$^2$] | 6.0 | 2.3 | 3.7 | 6.4 |
| SH radial | [%] | 1.5 | 1.3 | 1.3 | 1.1 |
| CLTE −30/80 | [μm/mK] | 96 | 84 | 83 | 89 |
| Scratch resistance 10N | ΔL | | 2.1 | 2.3 | 2.8 |
| Gloss (60°) | [%] | | 3.2 | 3.3 | 3.4 |

*Rest to 100 wt.-% are additives, like antioxidants and pigments (e.g. Carbon black)

The invention claimed is:

1. Polyolefin composition (PO) comprising:
   (a) a heterophasic propylene copolymer (HECO) comprising:
      (a1) a polypropylene (PP) having a melt flow rate MFR$_2$ (230° C.) of 30 to 350 g/10 min, and
      (a2) an elastomeric propylene copolymer (E) having an intrinsic viscosity (IV) in the range of 1.5 to 3.0 dl/g measured as the intrinsic viscosity (IV) of the xylene cold soluble (XCS) fraction of the heterophasic propylene copolymer (HECO), and
   (b) a polyethylene (PE) having a melt flow rate MFR$_2$ (190° C.) of 25 to 80 g/10 min, wherein, the polyethylene (PE) is an ethylene homopolymer and has a density of at least 945 kg/m$^3$, wherein further:
      (i) the total polyolefin composition (PO) has a melt flow rate MFR$_2$ (230° C.) of more than 15 to 200 g/10min, and
      (ii) the weight ratio of the elastomeric propylene copolymer (E) to the polyethylene (PE) is below 2.0.

2. Polyolefin composition (PO) according to claim 1, wherein:
   (a) the amount of the elastomeric propylene copolymer (E) within the heterophasic propylene copolymer (HECO) is 20 to 50 wt. %, and/or
   (b) the elastomeric propylene copolymer (E) has a comonomer content of 15 to 75 wt. %, the comonomers are ethylene and/or a C$_4$ to C$_{12}$ α-olefin.

3. Polyolefin composition (PO) according to claim 1, wherein the polypropylene (PP) has:
   (a) a melting temperature of at least 135° C., and/or
   (b) a comonomer content of equal or below 10 wt. %, the comonomers are ethylene and/or a C$_4$ to C$_{12}$ α-olefin.

4. Polyolefin composition (PO) according to claim 1, wherein the polypropylene (PP) is a propylene homopolymer (H-PP).

5. Polyolefin composition (PO) according to claim 1, wherein the heterophasic propylene copolymer (HECO) has:
   (a) a melt flow rate MFR$_2$ (230° C.) of more than 15 to 300 g/10 min, and/or
   (b) a comonomer content in the range of 6.0 to 18 wt. %, the comonomers are ethylene and/or a C$_4$ to C$_{12}$ α-olefin.

6. Polyolefin composition (PO) according to claim 1, wherein the polyolefin composition (PO) comprises up to 30 wt. % of an inorganic filler.

7. Polyolefin composition (PO) according to claim 6, wherein the inorganic filler has a cutoff particle size d95 [mass percent] of equal or below 20 μm.

8. Polyolefin composition (PO) according to claim 1, wherein the polyolefin composition (PO) comprises up to 30 wt. % of a polyethylene (PE2) having:
   (a) a density of below 940 kg/m$^3$, and/or
   (b) a melt flow rate MFR$_2$ (190° C.) of 0.5 to 30 g/10 min, with the proviso that the polyethylene (PE2) differs from the polyethylene (PE) in density and/or melt flow rate.

9. Polyolefin composition (PO) according to claim 1, wherein the polyolefin composition (PO) has:
   (a) a tensile modulus of at least 900 MPa, and/or
   (b) an impact strength at 23° C. of at least 10 kJ/m$^2$, and/or
   (c) a coefficient of linear thermal expansion (CLTE) performed in a temperature range from −30 to +80° C. of not more than 100 μm/mK.

10. Automotive article comprising the polyolefin composition (PO) according to claim 1.

11. Automotive article according to claim 10, wherein the automotive article is an exterior automotive article.

12. Process for the preparation of the polyolefin composition (PO) according to claim 1, comprising extruding the heterophasic propylene copolymer (HECO), the polyethylene (PE), and optionally the inorganic filler (F) and the polyethylene (PE2), in an extruder.

13. Process according to claim 12, wherein the heterophasic propylene copolymer (HECO) is obtained by producing the polypropylene (PP) in one reactor, transferring said polypropylene (PP) in a subsequent reactor, where in the presence of the polypropylene (PP) the elastomeric propylene copolymer (E) is produced.

* * * * *